United States Patent
Lim (10) Patent No.: US 7,646,410 B2
(45) Date of Patent: Jan. 12, 2010

(54) SOLID STATE IMAGE SENSING DEVICE AND METHOD FOR SUBSAMPLING USING INTER-COLUMN ANALOG DOMAIN SIGNAL SUMMATION

(75) Inventor: Su-Hun Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 708 days.

(21) Appl. No.: 11/370,634

(22) Filed: Mar. 8, 2006

(65) Prior Publication Data

US 2006/0203110 A1 Sep. 14, 2006

(30) Foreign Application Priority Data

Mar. 9, 2005 (KR) .................... 10-2005-0019572

(51) Int. Cl.
*H04N 5/217* (2006.01)
*H04N 3/14* (2006.01)

(52) U.S. Cl. ...................... 348/241; 348/272

(58) Field of Classification Search .............. 348/314, 348/324

See application file for complete search history.

(56) References Cited

U.S. PATENT DOCUMENTS 6,466,266 B1 * 10/2002 Guidash et al. ............. 348/308
6,512,545 B1 * 1/2003 Mizoguchi et al. .......... 348/304
2002/0167611 A1 * 11/2002 Boemler et al. ............. 348/572

FOREIGN PATENT DOCUMENTS

| EP | 0967729 | 12/1999 |
|---|---|---|
| JP | 2001-036816 | 2/2001 |
| JP | 2002-010145 | 1/2002 |
| KR | 1020020082734 A | 10/2002 |
| KR | 10-200-30094511 | 12/2003 |

OTHER PUBLICATIONS

First Office Action issued by Chinese Patent Office on Nov. 7, 2008 in corresponding Chinese application No. 2006100793687.

* cited by examiner

*Primary Examiner*—Tuan Ho
*Assistant Examiner*—Hung H Lam
(74) *Attorney, Agent, or Firm*—F. Chau & Associates, LLC (57) ABSTRACT

Provided are a solid state image sensing device and method for sub-sampling using inter-column analog domain signal summation, where, in the solid state image sensing device, a CDS unit receives reset signals from neighboring columns of the same color in an APS array, receives video signals from pixels generating the reset signals, and generates modulation signals respectively corresponding to the differences between the reset signals and the video signals, the modulation signals are activated according to activation of the previous modulation signals, and a digital signal output circuit generates a corresponding digital signal based on the final modulation signal corresponding to the sum of inter-column analog video signals among the modulation signals.

18 Claims, 9 Drawing Sheets

SOLID STATE IMAGE SENSING DEVICE AND METHOD FOR SUBSAMPLING USING INTER-COLUMN ANALOG DOMAIN SIGNAL SUMMATION

CROSS-REFERENCE TO RELATED APPLICATION

This application claims foreign priority under 35 U.S.C. § 119 to Korean Patent Application No. 10-2005-0019572, filed on Mar. 9, 2005, in the Korean Intellectual Property Office, the disclosure of which is incorporated herein in its entirety by reference.

BACKGROUND OF THE INVENTION

1. Field of the Invention

The present disclosure relates to image sensing, and more particularly, to circuits and methods for sub-sampling of image sensing devices.

2. Description of the Related Art

A Charge-Coupled Device (CCD) has been used as the most popular solid state image sensing device. With the growth of the semiconductor industry, the CCD has been rapidly developed and eventually applied to high-performance small cameras. Although the CCD is an important image pick-up device, a CCD sensor, a core element of a digital camera, consumes relatively large amounts of energy and is not suitable for high-speed operation. Accordingly, a CMOS Image Sensor (CIS) capable of realizing high resolution of more than hundreds of pixels has been developed. The CIS can be highly integrated such that a very large number of pixels can be arranged to perform fast data scanning. In addition, the CIS consumes less power, that is approximately ⅕ of the power consumed by the CCD, and has a low manufacturing cost. Thus, a large-size CIS can be produced at a relatively low cost. The CIS can be manufactured on a chip using a process of fabricating MOSFETs or CMOS transistors, and thus signal processing circuits can be formed on the same chip while reducing the number of connecting lines. Moreover, the CIS can be operated with a voltage lower than the voltage driving the CCD, and its periphery circuits can be arranged on the same chip. This can reduce the size of the CIS. Accordingly, the CIS may be an important image sensing device as an alternative or replacement for the CCD solid state image sensing device in future digital video systems.

A CIS type solid state image sensing device is applied to a cellular phone camera, a digital still camera, and the like. Color image data (R, G and B data) output from the solid state image sensing device drives a display device such as a Liquid Crystal Display (LCD). In a system employing the CIS type solid state image sensing device, a sub-sampling mode of operation of the solid state image sensing device outputs a video signal with a reduced vertical resolution. The sub-sampling mode supports a high frame rate when a high-resolution display is not required, such as, for example, when a moving image display is displayed, an image to be captured is previewed, or automatic focus is set.

Figure 1:
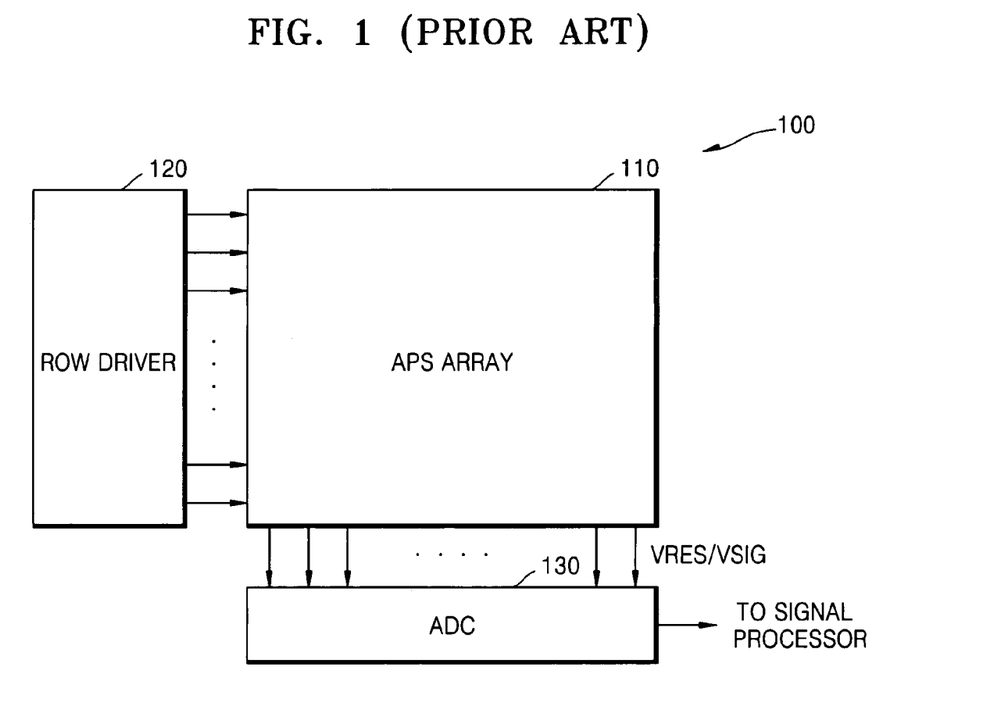
FIG. 1 is a block diagram of a conventional CIS type solid state image sensing device.

FIG. 1 is a block diagram of a conventional CIS type solid state image sensing device 100. Referring to FIG. 1, the conventional CIS type solid state image sensing device 100 includes an Active Pixel Sensor (APS) array 110, a row driver 120, and an analog-to-digital converter (ADC) 130. The row driver 120 receives a control signal from a row decoder (not shown) and the analog-to-digital converter 130 receives a control signal from a column decoder (not shown). The solid state image sensing device 100 further includes a controller (not shown) generating timing control signals and addressing signals for outputting a selected and sensed video signal of each pixel. In the solid state image sensing device 100, in general, a color filter is arranged on each of the pixels constructing the APS array 110 such that only light having a specific color is output from the pixels. To construct color signals, at least three kinds of color filters are arranged on the APS array 110. The most general color filter array has a Bayer pattern in which red and green color patterns are arranged in one row and green and blue color patterns are arranged in another row. Here, the green color pattern, which is closely related to a luminance signal, is arranged in all rows and the red and blue color patterns are alternately arranged in the rows to improve luminance resolution. A CIS having more than one million pixels is applied to a digital still camera in order to improve resolution.

In the CIS type solid state image sensing device 100, the APS array 110 senses light using photodiodes and converts the sensed light into electric signals to generate video signals. The video signals output from the APS array 110 include red (R), green (G) and blue (B) analog signals. The analog-to-digital converter 130 receives the analog video signals output from the APS array 110 and converts the analog video signals into digital signals.

In the conventional CIS type solid state image sensing device 100 shown in FIG. 1, the analog-to-digital converter 130 converts the video signals sensed by the photodiodes into digital signals using a Correlated Double Sampling (CDS) method, which is disclosed in U.S. Pat. No. 5,982,318 and U.S. Pat. No. 6,067,113. CDS analog-to-digital conversion is divided into a step of receiving reset signals from the APS array 110 and a step of receiving video signals sensed by the photodiodes to convert the video signals into digital signals.

Figure 2:
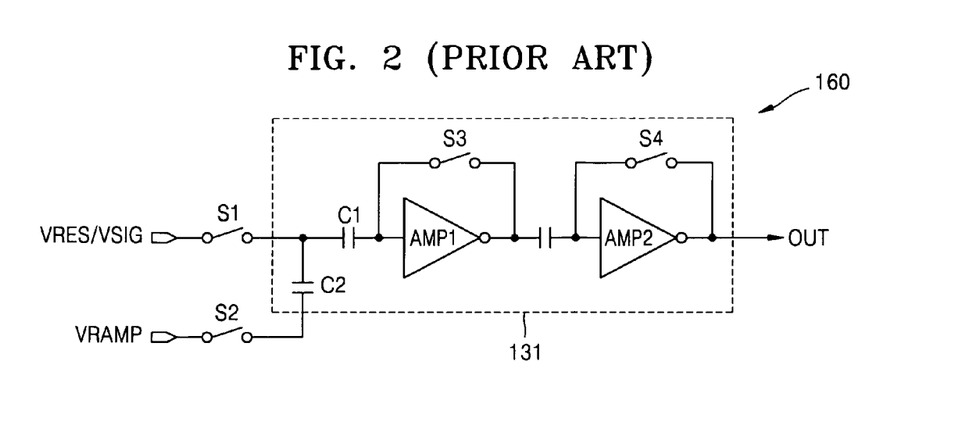
FIG. 2 is a circuit diagram of the CDS unit included in the analog-digital converter of FIG. 1.
Figure 3:
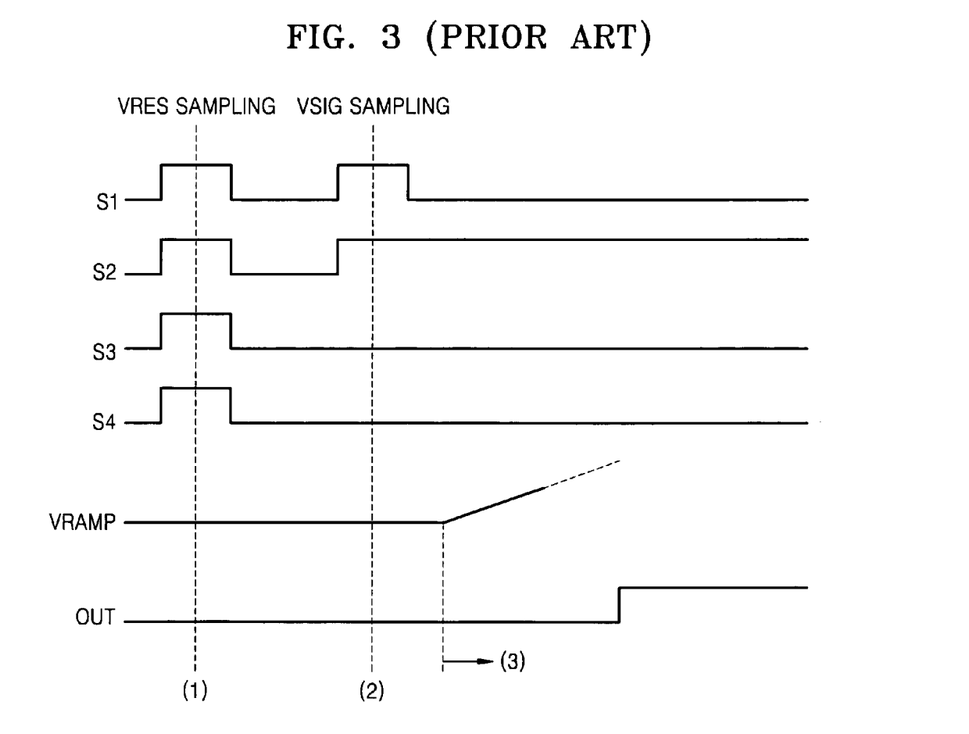
FIG. 3 is a timing diagram explaining the operation of the CDS unit of FIG. 2.

FIG. 2 is a circuit diagram of a Correlated Double Sampling (CDS) unit 160 for each column, which is included in the analog-to-digital converter 130 of FIG. 1. Referring to FIG. 2, whenever the photodiodes of the APS array 110 newly sense light at a predetermined period, the APS array 110 outputs a reset signal VRES to the CDS unit 160 before the photodiodes output a newly sensed video signal VSIG to the CDS unit 160. A column CDS circuit 131 amplifies a difference between the reset signal VRES and the video signal VSIG using a ramp signal VRAMP. Referring to FIG. 3, switches S1, S2, S3 and S4 in the CDS circuit 131 are all turned on and the reset signal VRES is input to the column CDS circuit 131 at the instant of time (1). At the instant of time (2), only the switches S1 and S2 are turned on and the sensed video signal VSIG is input to the column CDS circuit 131. At the instant of time (3), all the switches S1, S2, S3 and S4 are turned off and the ramp signal VRAMP is activated. Accordingly, the difference between the reset signal VRES and the video signal VSIG, stored in capacitors C1 and C2, is increased as the ramp signal VRAM is increased. An output signal OUT, which is activated when the increased difference exceeds a predetermined reference level, is generated by amplifiers AMP1 and AMP2. Here, the instant of time when the output signal OUT is activated is delayed as the difference between the reset signal VRES and the video signal VSIG is increased.

The output signal OUT of the column CDS circuit 131 is converted into a digital value proportional to its pulse width in a predetermined circuit. The converted digital signal is interpolated in a subsequent processor and drives a display device such as an LCD.

When the CIS solid state image sensing device captures a still image, video signals of all pixels, sensed by the photodiodes of the APS array 110, are output. In the sub-sampling mode, however, the video signals are output with reduced resolution. In the case of a CIS type solid state image sensing device having an APS array with Super extended Graphic Adapter (SXGA) resolution, for example, the solid state image sensing device outputs SXGA-grade video signals when it photographs a still image. However, the solid state image sensing device outputs Video Graphics Adapter (VGA)-grade video signals in sub-sampling mode operations including a moving picture display operation, a preview operation and an automatic focusing operation. For reference, the number of pixels of SXGA resolution is 1280×1024 and the number of pixels of VGA resolution is 640×480. In a typical example, even a CIS type solid state image sensing device having an APS array with Ultra extended Graphics Adapter (UXGA) resolution outputs video signals with less than VGA-grade resolution in the sub-sampling mode to reduce the quantity of processed data. For reference, the number of pixels of UXGA resolution is 1600×1200.

In the sub-sampling mode of the conventional CIS type solid state image sensing device 100, only video signals of a specific row and column arranged at a predetermined interval are output to the analog-digital converter 130 to reduce vertical resolution. To decrease SXGA resolution to VGA resolution, for instance, only data corresponding to the intersection of one row and one column is selected from pixel data corresponding to two rows and two columns and other data are removed such that resolution is reduced by half. When only data corresponding to one row and column are selected from data corresponding to many rows and columns, the resolution can be further reduced and thus the quantity of processed data can be further decreased.

Unfortunately, there also exists a video signal VSIG that is not used, but discarded, in the sub-sampling mode of the conventional CIS type solid state image sensing device 100. This increases the Signal to Noise Ratio (SNR) distortion and causes aliasing that does not smoothly display oblique lines on a display.

SUMMARY OF THE INVENTION

The present disclosure provides a solid state image sensing device supporting sub-sampling using the sum of column video signals in an analog domain without discarding any column video signal output from an APS array to improve an SNR in a sub-sampling mode.

The present disclosure also provides a method for driving a solid state image sensing device supporting sub-sampling using the sum of column video signals in an analog domain.

According to an aspect of the present disclosure, there is provided a solid state image sensing device including an Active Pixel Sensor (APS) array, a Correlated Double Sampling (CDS) unit, and a digital signal output circuit. The APS array includes pixels arranged in a two-dimensional matrix form and generates reset signals and video signals of respective columns in a selected row. The CDS unit receives reset signals from neighboring columns of the same color, receives video signals from pixels generating the reset signals, and generates modulation signals respectively corresponding to the differences between the reset signals and the video signals such that each of the modulation signals is activated according to activation of the previous modulation signal. The digital signal output circuit generates a corresponding digital signal based on the instant of time when the logic state of the finally activated modulation signal among the modulation signals is changed. The instant of time when the logic state of the finally activated modulation signal is changed corresponds to the sum of the differences between the reset signals and the video signals of the same color.

In an aspect of the present disclosure, the CDS unit generates a modulation signal of a column, which is activated when the difference between the reset signal and the video signal from the column reaches a reference level in response to a ramp signal, and generates a modulation signal of the next column having the same color as that of the column, which is activated when the difference of the reset signal and the video signal of the next column reaches the reference level in response to the ramp signal according to activation of the previously generated modulation signal.

In another aspect of the present disclosure, the CDS unit generates modulation signal groups respectively corresponding to neighboring rows as many as the number of the reset signals or the video signals and sums up the pulse widths of finally activated modulation signals among the modulation signal groups. The digital signal output circuit generates the corresponding digital signal based on the sum value, the neighboring rows having the same pattern as that of the selected row.

The digital signal output circuit sums up digital signals generated from the finally activated modulation signals among the modulation signal groups corresponding to the neighboring rows as many as the number of the reset signals or the video signals.

According to another aspect of the present disclosure, there is provided a method for driving a solid state image sensing device including: generating reset signals and video signals of respective columns in a selected row in an APS array in which pixels are arranged in a two-dimensional matrix form; receiving reset signals from neighboring columns of the same color; receiving video signals from pixels generating the reset signals; generating modulation signals respectively corresponding to the differences between the reset signals and the video signals such that each of the modulation signals is activated according to activation of the previous modulation signal; and generating a corresponding digital signal based on the instant of time when the logic state of the finally activated modulation signal among the modulation signals is changed.

BRIEF DESCRIPTION OF THE DRAWINGS

The above and other features and advantages of the present disclosure will become more apparent by describing in detail exemplary embodiments thereof with reference to the attached drawings, in which.

DETAILED DESCRIPTION OF PREFERRED EMBODIMENTS

The present disclosure will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals may refer to like elements.

Figure 4:
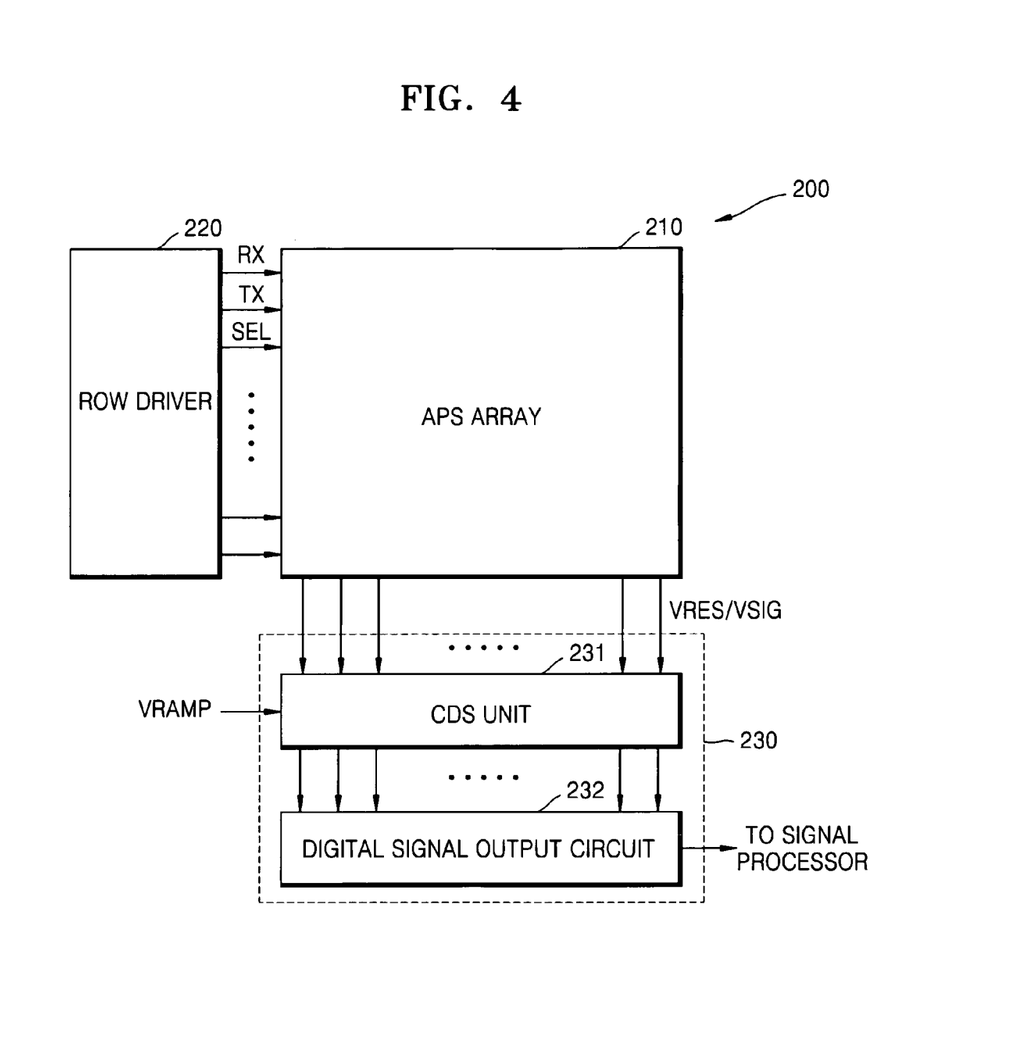
FIG. 4 is a block diagram of a solid state image sensing device according to an embodiment of the present disclosure.

FIG. 4 is a block diagram of a CMOS Image Sensor (CIS) type solid-state image sensing device 200 according to an embodiment of the present disclosure. The solid state image sensing device 200 includes an Active Pixel Sensor (APS) array 210, a row driver 220, and an analog-to-digital conversion unit 230. The analog-to-digital conversion unit 230 includes a Correlated Double Sampling (CDS) unit 231 and a digital signal output circuit 232.

The CIS type solid state image sensing device 200, which may be set in a cellular phone, a digital still camera, or the like, captures an image and converts the image into an electric signal to output a digital video signal.

The APS array 210 generates reset signals VRES and video signals VSIG of respective columns from pixels of a selected row using a control signal TX, a reset control signal RX, and a row select signal SEL for selecting a row of the APS array 210, which are generated by the row driver 220. The analog-digital conversion unit 230 generates digital color signals R, G and B corresponding to the captured image from the reset signals VRES and the video signals VSIG generated in the APS array 210. The generated digital color signals R, G and B are interpolated in a subsequent processor and then displayed on a display such as a Liquid Crystal Display (LCD).

Figure 5:
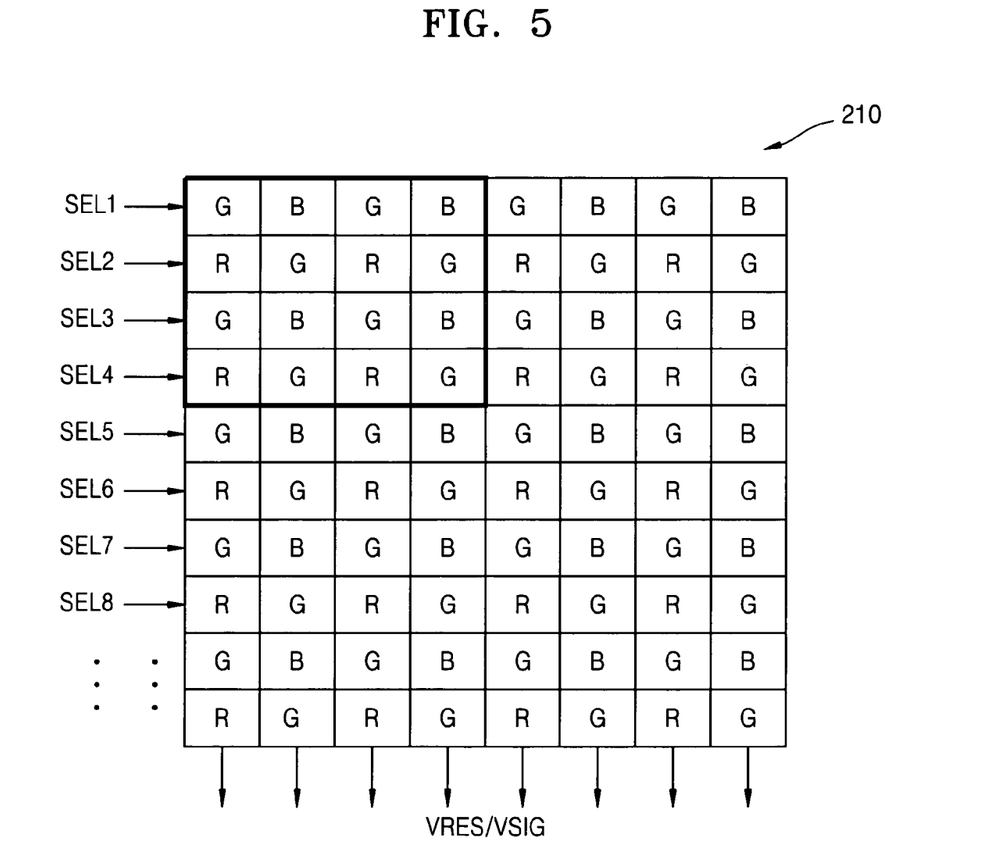
FIG. 5 illustrates a color pattern of the APS array of FIG. 4.

FIG. 5 illustrates a color pattern of the APS array 210 of FIG. 4. The APS array 210 senses external light using photodiodes and converts the sensed light into an electric signal to output a corresponding video signal. The photodiodes are respectively arranged in pixels arranged in a two-dimensional matrix form in the APS array 210. It is assumed that a color filter pattern of the APS array 210 has a Bayer pattern shown in FIG. 5. First and second color signals G and B are generated in a row selected by a corresponding row select signal among sequential row select signals SEL1, SEL2, SEL3, . . . and the first color signal G and a third color signal R are generated in another row selected by a corresponding row select signal. In this manner, color signals are alternately repeatedly generated. In alternate embodiments, the pixel array pattern is not limited to the Bayer pattern and can have various forms.

Figure 6:
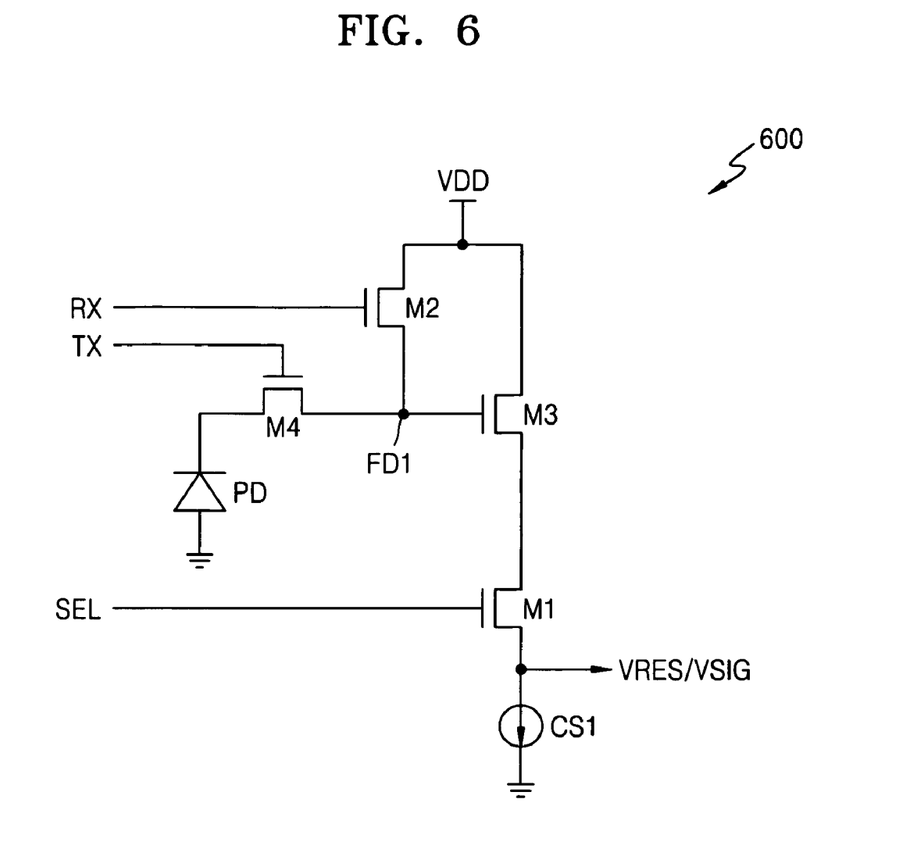
FIG. 6 is a circuit diagram of a unit pixel circuit constructing the APS array of FIG. 4.

FIG. 6 is a circuit diagram of a unit pixel circuit 210 constructing the APS array 210 of FIG. 4. To generate a corresponding color signal from each pixel in the APS array 210, the unit pixel circuit 600 constructing the APS array 210 generates a reset signal VRES in a row selected by the row select signal SEL in response to the reset control signal RX, and generates a photoelectric-converted video signal VSIG from a photodiode PD in response to a transfer control signal TX.

For example, the unit pixel circuit 600 includes four MOSFETs M1, M2, M3 and M4 and a single photodiode PD. When the row select signal SEL is activated to a logic high state, the voltage at a node FD1, transmitted from a power supply VDD in response to the reset control signal RX, is output through the source of the source follower M3. The voltage at the node FD1, output through the source of the source follower M3, is output to the CDS unit 231 as the reset signal VRES between the source of the transistor M1 and a bias circuit CS1. When the transfer control signal TX is activated to a logic high state, the reset control signal RX is in a logic low state and the photoelectric-converted video signal VSIG from the photodiode PD is output to the CDS unit 231 between the source of the transistor M1 and the bias circuit CS1.

The CDS unit 231 generates modulation signals respectively corresponding to differences between reset signals VRES and video signals VSIG of respective columns. In the solid state image sensing device of the present embodiment, the CDS unit 231 generates an analog modulation signal corresponding to the sum of analog video signals in a group for reduced resolution in the sub-sampling mode. The digital signal output circuit 232 converts the analog modulation signal into a corresponding digital signal.

Figure 7:
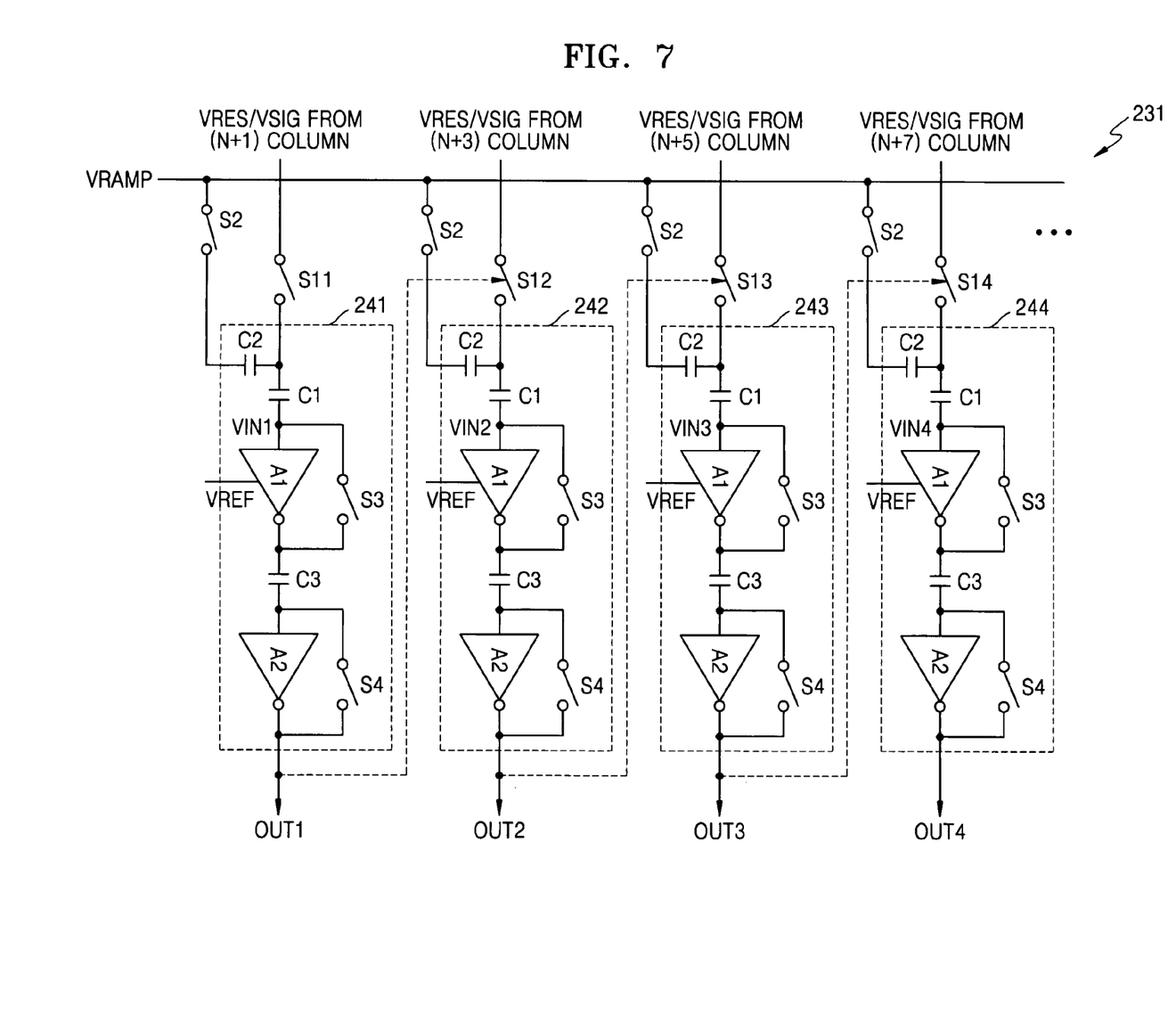
FIG. 7 is a circuit diagram of the CDS unit constructing the analog-digital conversion unit of FIG. 4.

FIG. 7 is a circuit diagram of the CDS unit 231 constructing the analog-to-digital conversion unit of FIG. 4. Referring to FIG. 7, the CDS unit 231 includes switches S2 commonly switched for respective columns under the control of a controller, switches S11, S12, S13, and S14 switched under the control of the controller and modulation signals of previous columns, and CDS circuits 241, 242, 243 and 244 respectively generating modulation signals of the respective columns.

The switches S2 are switched in response to a control signal of the controller to output a ramp signal VRAMP to the CDS circuits 241, 242, 243 and 244, respectively. The switches S11, S12, S13 and S14 are switched in response to a control signal of the controller to output reset signals VRES and video signals VSIG, which are respectively generated in columns of a selected row, to the CDS circuits 241, 242, 243 and 244, respectively.

Each of the CDS circuits 241, 242, 243 and 244 includes a first capacitor C1, a second capacitor C2, a third capacitor C3, a first amplifier A1, a second amplifier A2, a third switch S3, and a fourth switch S4. The first capacitor C1 is connected between the output terminal of the switch S11, S12, S13 or S14 transferring the corresponding reset signal VRES and video signal VSIG from the APS array 210 and the input terminal VIN1, VIN2, VIN3 or VIN4 of the first amplifier A1. The second capacitor C2 is connected between the output terminal of the switch S2 transferring the ramp signal VRAMP and the output terminal of the switch S11, S12, S13 or S14. The third capacitor C3 is connected between the output terminal of the first amplifier A1 and the input terminal of the second amplifier A2. The first amplifier A1 compares a signal input thereto with a reference level VREF and amplifies the compared result. The second amplifier A2 amplifies a signal input thereto to stabilize it. The third switch S3 is connected between the input terminal and the output terminal of the first amplifier A1 and the fourth switch S4 is connected between the input terminal and the output terminal of the second amplifier A2. The third and fourth switches S3 and S4 are short-circuited to respectively reset the amplifiers A1 and A2 when the reset signal VRES is transmitted from the APS array 210 via the switches S11, S12, S13 or S14. The third capacitor C3, the second amplifier A2 and the fourth switch S4 are optional elements for stabilizing the output signal of the first amplifier A1.

FIG. 7 illustrates the CDS unit 231 composed of four CDS circuits 241, 242, 243 and 244 corresponding to four columns (odd-numbered columns or even-numbered columns) of the same color in order to realize the sub-sampling mode for ¼ resolution. In FIG. 7, only one group of CDS circuits 241, 242, 243 and 244 for ¼ resolution is shown and other CDS circuit groups are omitted. The operations of the omitted other CDS circuit groups are identical to the operation of the group of the CDS circuits 241, 242, 243 and 244. For ½resolution, a group of CDS circuits corresponding to two columns is used. In this manner, CDS circuits can be grouped in various forms for various reduced resolutions such as ⅓, ⅕, ⅙ resolutions.

When the third switch S3 of each of the CDS circuits 241, 242, 243 and 244 is turned on, the reset signal VRES from the APS array 210 is transmitted to the first capacitor C1 via the switch S11, S12, S13 or S14. When the third switch S3 is turned off, the video signal VSIG from the APS array 210 is transmitted to the first capacitor C1 via the switch S11, S12, S13 or S14. Accordingly, the CDS circuits 241, 242, 243 and 244 generate differences between the reset signals VRES and the video signals VSIG of respective columns and generate modulation signals OUT1, OUT2, OUT3 and OUT4 activated when the differences reach the reference level VREF in response to the ramp signal VRAMP, respectively.

In a normal mode rather than a sub-sampling mode, the switches S11, S12, S13 and S14 are individually operated in response to a control signal of the controller. Accordingly, the CDS circuits 241, 242, 243 and 244 generate the modulation signals OUT1, OUT2, OUT3 and OUT4 in the normal mode. The digital signal output circuit 232 converts the analog modulation signals OUT1, OUT2, OUT3 and OUT4 into corresponding digital signals.

In the sub-sampling mode, however, the CDS circuits 241, 242, 243 and 244 generate the analog modulation signal corresponding to the sum of the video signals of the respective columns. That is, the operations of the switches S1, S12, S13 and S14 in the sub-sampling mode are different from their operations in the normal mode. The switches S11, S12, S13 and S14 are each turned on when they start to receive the video signals VSIG from the APS array 210. However, the switch S12 is controlled by the modulation signal OUT1 generated in the CDS circuit 241, the switch S13 is controlled by the modulation signal OUT2 generated in the CDS circuit 242, and the switch S14 is controlled by the modulation signal OUT3 generated in the CDS circuit 243. Thus, the sum of the video signals of the four columns is reflected on the analog modulation signal OUT4 generated in the CDS circuit 244. The digital signal output circuit 232 converts the analog modulation signal OUT4 into a corresponding digital signal. Accordingly, sub-sampling for ¼ resolution can be realized.

Figure 8:
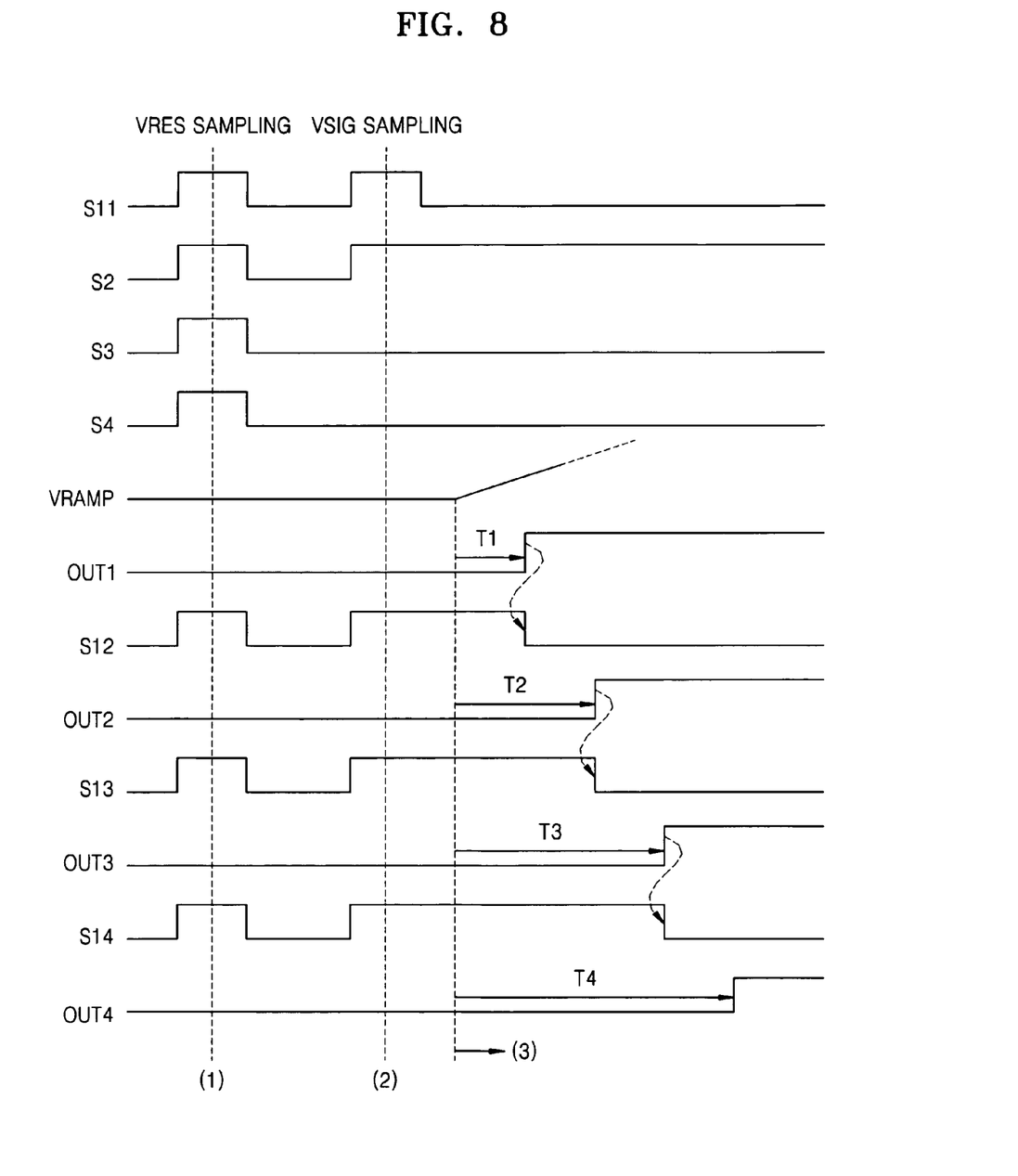
FIG. 8 is a timing diagram explaining the operation of the CDS unit of FIG. 7.
Figure 9:
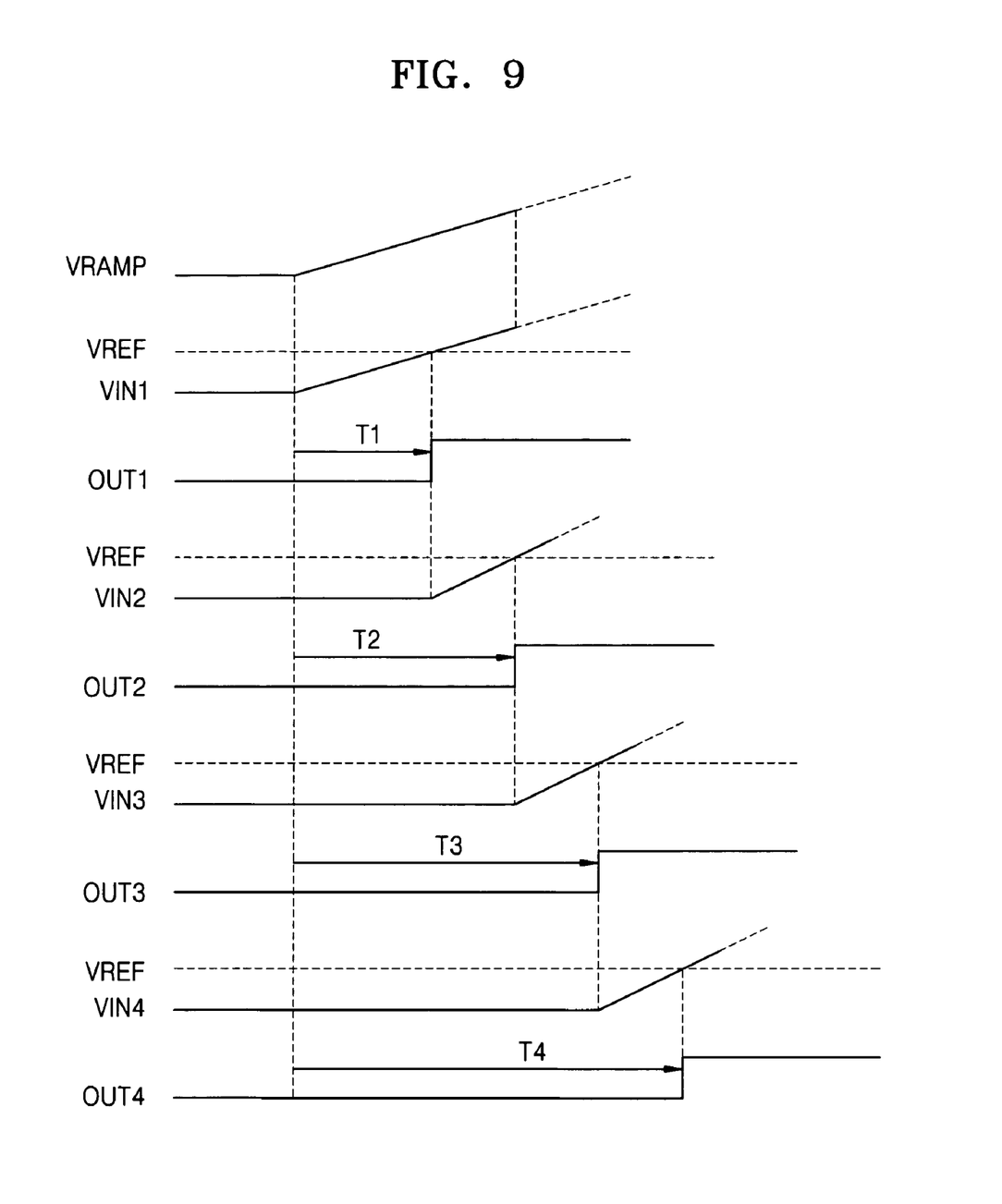
FIG. 9 is a timing diagram explaining summation of inter-column analog domain signals in the CDS unit of FIG. 7.

The operation of the CDS unit 231 of FIG. 7 will now be explained in more detail with reference to FIGS. 8 and 9. FIG. 8 is a timing diagram explaining the operation of the CDS unit 231 of FIG. 7 and FIG. 9 is a timing diagram explaining summation of inter-column analog signals in the CDS unit 231.

Referring to FIG. 8, the switches S11, S12, S13 and S14 are all turned on to sample the reset signals VRES of the respective columns at the instant of time (1). Here, the switches S2, S3 and S4 are also turned on in order to reset the capacitors C1, C2 and C3 and the amplifiers A1 and A2. Accordingly, the CDS circuits 241, 242, 243 and 244 receive the reset signals of the four columns of the same color and store charges corresponding to the reset signals in the capacitors C1, respectively.

At the instant of time (2), the switches S2, S11, S12, S13 and S14 are turned on to sample the video signals from pixels generating the reset signals. Accordingly, charges corresponding to the differences between the reset signals VRES and the video signals VSIG are stored in the capacitors C1 of the respective CDS circuits 241, 242, 243 and 244, respectively. When the reset signals VRES and the video signals VSIG are respectively input to the CDS signals 241, 242, 243 and 244 and the charges corresponding to the differences between the reset signals VRES and the video signals VSIG are respectively stored in the capacitors C1 of the respective CDS circuits 241, 242, 243 and 244, the ramp signal VRAMP is activated to be gradually increased to a predetermined level at the instant of time (3). The first amplifiers A1 of the respective CDS circuits 241, 242, 243 and 244 generate the modulation signals of the corresponding columns, which are activated when the voltage levels of the input terminals VIN1, VIN2, VIN3 and VIN4 of the first amplifiers A1 reach the reference level VREF, in response to the ramp signal VRAMP transmitted via the switches S2, respectively (referring to FIG. 9).

However, the first amplifiers A1 of the respective CDS circuits 241, 242, 243 and 244 do not simultaneously output voltages increased in response to the ramp signal VRAMP because the switches S11, S12, S13 and S14 are turned off at different instants of time. First, the switch S11 is turned off at the instant of time (3) and thus the voltage level of the input terminal VIN1 of the first amplifier A1 of the CDS circuit 241, which has a value corresponding to the difference between the corresponding reset signal VRES and the corresponding video signal VSIG, is gradually increased in response to the ramp signal VRAMP transmitted through the switch S2. The first amplifier A1 of the CDS circuit 241 compares the voltage level of its input terminal VIN1 with the reference level VREF and generates the modulation signal OUT1 of an (N+1) column, which is activated when the voltage level of the input terminal VIN1 reaches the reference level VREF.

Accordingly, the switch S12 is turned off when the modulation signal OUT1 of the (N+1) column, which is generated in the CDS circuit 241, is activated. Then, the first amplifier A1 of the CDS circuit 242 generates the modulation signal OUT2 of an (N+3) column, which is activated when the voltage level of the input terminal VIN2 of the first amplifier A1 of the CDS circuit 242 reaches the reference level VREF, in response to the ramp signal VRAMP transmitted via the switch S2.

Subsequently, the switch S13 is turned off when the modulation signal OUT2 of the (N+3) column, which is generated in the CDS circuit 242, is activated. Accordingly, the first amplifier A1 of the CDS circuit 243 generates the modulation signal OUT3 of an (N+5) column, which is activated when the voltage level of the input terminal VIN3 of the first amplifier A1 of the CDS circuit 243 reaches the reference level VREF, in response to the ramp signal VRAMP transmitted via the switch S2. The switch S14 is turned off when the modulation signal OUT3 of the (N+5) column, which is generated in the CDS circuit 243, is activated. Then, the first amplifier A1 of the CDS circuit 244 generates the modulation signal OUT4 of an (N+7) column, which is activated when the voltage level of the input terminal VIN4 of the first amplifier A1 of the CDS circuit 244 reaches the reference level VREF, in response to the ramp signal VRAMP transmitted via the switch S2.

As described above, the CDS circuits 241, 242, 243 and 244 activate the modulation signals according to activation of the previous modulation signals to generate the modulation signals corresponding to the differences between the reset signals and the video signals. In the sub-sampling mode, all the modulation signals generated in the CDS circuits 241, 242, 243 and 244 are not converted into digital signals. The sum of the video signals of the four columns is reflected on the modulation signal OUT4 generated in the CDS circuit 244 and the digital signal output circuit 232 converts only the analog modulation signal OUT4 into a corresponding digital signal. Accordingly, sub-sampling for ¼ resolution can be realized.

Figure 10:
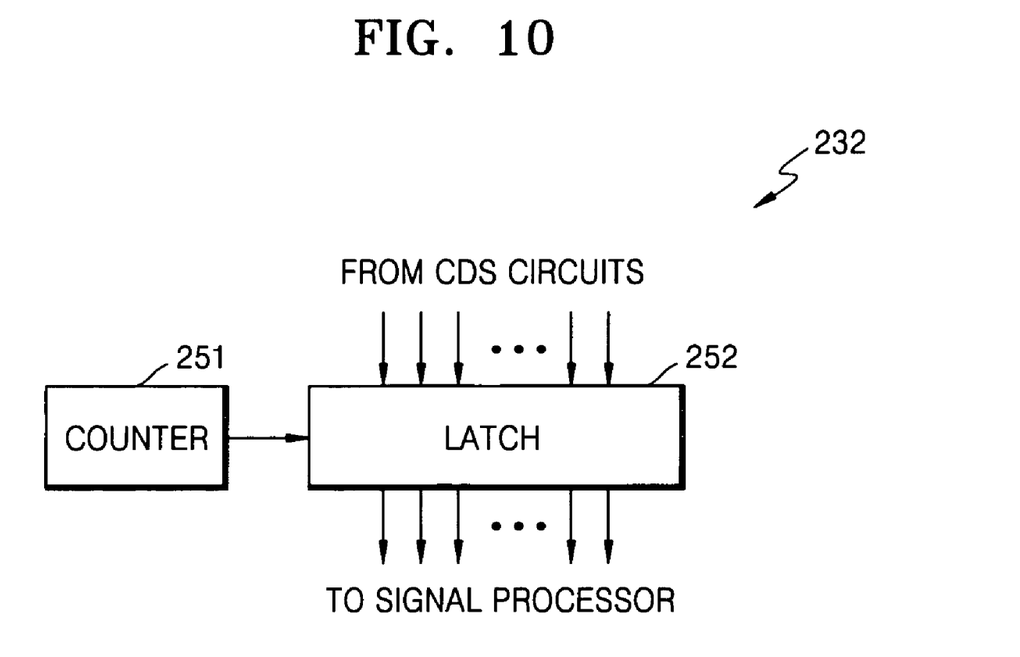
FIG. 10 is a block diagram of the digital signal output circuit constructing the analog-digital conversion unit of FIG. 4.

FIG. 10 is a block diagram of the digital signal output circuit 232 constructing the analog-to-digital conversion unit of FIG. 4. Referring to FIG. 10, the digital signal output circuit 232 includes a counter 251 and a latch 252. The counter 251 starts counting when the ramp signal VRAMP is increased, and outputs a count value, corresponding to the instant of time when the logic state of the modulation signal is generated in each CDS circuit, to the latch 252. The latch 252 stores and outputs the count value received from the counter 251. In the solid state image sensing device of the present embodiment, in particular, the digital signal output circuit 232 generates a corresponding digital signal based on the instant of time when the logic state of the finally activated modulation signal OUT4, according to activation of the previous modulation signals OUT1 OUT2 and OUT3 for sub-sampling, is changed. Here, the sum of the differences between the reset signals and the video signals is reflected on the instant of time when the logic state of the modulation signal OUT4 is changed, as described above.

The rate of reflecting video signals on the digital output signal can be increased using summation of analog video signals or digital video signals from N×N pixels of the same color using the basic operation of the CDS unit 231 to reduce SNR distortion.

Specifically, to use analog summation of the video signals from the N×N pixels of the same color, the CDS unit 231 can generate modulation signal groups respectively corresponding to neighboring rows as many as the number of reset signals or video signals generated in columns of the same color in a selected row. The neighboring rows have the same pattern as that of the selected row. Here, the CDS unit 231 can perform analog summation of the pulse widths of finally activated modulation signals, as shown in FIGS. 8 and 9, among the generated modulation signal groups. When the digital signal output circuit 232 converts the sum into a corresponding digital signal, sub-sampling for 1/N resolution using the video signals from the N×N pixels of the same color can be achieved.

In addition, to use digital summation of the video signals from the N×N pixels of the same color, the digital signal output circuit 232 can generate digital signals corresponding to the finally activated modulation signals among the modulation signal groups corresponding to the neighboring rows as many as the number of the reset signals or the video signals generated in columns of the same color in the selected row, and store the digital signals. When the digital signal output circuit 232 sums up the digital signals corresponding to the finally activated modulation signals and outputs the summed signal, sub-sampling for 1/N resolution using the video signals from the N×N pixels of the same color can be achieved.

As described above, in the CIS type solid state image sensing device 200 according to the present disclosure, the CDS unit 231 receives reset signals from neighboring columns of the same color of the APS array 210, and receives video signals from pixels generating the reset signals, and generates modulation signals respectively corresponding to the differences between the reset signals and the video signals. Each of the modulation signals is activated when the previous modulation signal is activated or in response thereto. The digital signal output circuit 232 generates a corresponding digital signal based on the instant of time when the logic state of the finally activated modulation signal among the modulation signals is changed.

The CIS type solid-state image sensing device according to the present disclosure can be operated in the sub-sampling mode by using video signals of all columns or rows in a manner similar to charge summation in a CCD, but without discarding any video signal. This increases a video signal level to reduce SNR distortion and decreases aliasing noise appearing on a display. Accordingly, the CIS type solid state image sensing device of the present disclosure can be applied to mobile systems such as a cellular telephone, a digital still camera, and the like to improve display quality of sub-sampling in the case of a moving image display or preview.

While the present invention has been particularly shown and described with reference to exemplary embodiments thereof, it will be understood by those of ordinary skill in the pertinent art that various changes in form and details may be made therein without departing from the spirit and scope of the present invention as defined by the following claims.

What is claimed is:

1. A solid-state image sensing device comprising:
   an Active Pixel Sensor (APS) array in which pixels are arranged in a two-dimensional matrix form, the APS array generating reset signals and video signals of respective columns in a selected row;
   a Correlated Double Sampling (CDS) unit receiving reset signals from neighboring columns of the same color, receiving video signals from pixels generating the reset signals, and generating modulation signals respectively corresponding to the differences between the reset signals and the video signals such that each of the modulation signals is activated according to activation of the previous modulation signal; and
   a digital signal output circuit generating a corresponding digital signal based on the instant of time when the logic state of the finally activated modulation signal among the modulation signals is changed,
   wherein the CDS unit generates a modulation signal of a column, which is activated when the difference between the reset signal and the video signal from the column reaches a reference level in response to a ramp signal, and generates a modulation signal of the next column having the same color as that of the column, which is activated when the difference of the reset signal and the video signal of the next column reaches the reference level in response to the ramp signal according to activation of the previously generated modulation signal.

2. The solid state image sensing device of claim 1, wherein the instant of time when the logic state of the finally activated modulation signal is changed corresponds to the sum of the differences between the reset signals and the video signals of the same color.

3. The solid state image sensing device of claim 1, wherein the CDS unit generates modulation signal groups respectively corresponding to neighboring rows as many as the number of the reset signals or the video signals and sums up the pulse widths of finally activated modulation signals among the modulation signal groups, and the digital signal output circuit generates the corresponding digital signal based on the sum value, the neighboring rows having the same pattern as that of the selected row.

4. The solid state image sensing device of claim 1, wherein the digital signal output circuit sums up digital signals generated from the finally activated modulation signals among the modulation signal groups corresponding to the neighboring rows as many as the number of the reset signals or the video signals.

5. The solid-state image sensing device of claim 1, wherein the solid-state image sensing device is of a CIS type.

6. The solid state image sensing device of claim 1, wherein the APS array has a Bayer pattern pixel structure.

7. The solid state image sensing device of claim 1, wherein the CDS unit comprises:
- a first switch transferring the ramp signal;
- a second switch transferring the reset signals and the video signals; and
- CDS circuits generating the differences between the reset signals and the video signals and generating the modulation signals activated when the differences reach the reference level in response to the ramp signal, respectively, the CDS circuits being included in the respective columns, the second switch being tuned off when the modulation signal generated in the previous column is activated.

8. The solid state image sensing device of claim 7, wherein each of the CDS circuits comprises:
- a first capacitor connected between the output terminal of the second switch and a first node;
- a second capacitor connected between the output terminal of the second switch and the output terminal of the first switch;
- an amplifier comparing the signal of the first node with the reference level and amplifying the compared result; and
- a third switch connected between the first node and the output terminal of the amplifier, a corresponding reset signal being transmitted to the first capacitor when the third switch is turned on, a corresponding video signal being transmitted to the first capacitor when the third switch is turned off.

9. A method for driving a solid state image sensing device comprising:
- generating reset signals and video signals of respective columns in a selected row in an APS array in which pixels are arranged in a two-dimensional matrix form;
- receiving reset signals from neighboring columns of the same color;
- receiving video signals from pixels generating the reset signals;
- generating modulation signals respectively corresponding to the differences between the reset signals and the video signals such that each of the modulation signals is activated according to activation of the previous modulation signal; and
- generating a corresponding digital signal based on the instant of time when the logic state of the finally activated modulation signal among the modulation signals is changed, wherein the generating the modulation signals comprises:
- generating a modulation signal of a column, which is activated when the difference between the reset signal and the video signal from the column reaches a reference level in response to a ramp signal; and
- generating a modulation signal of the next column having the same color as that of the column, which is activated when the difference of the reset signal and the video signal of the next column reaches the reference level in response to the ramp signal according to activation of the previously generated modulation signal.

10. The method of claim 9, wherein the instant of time when the logic state of the finally activated modulation signal is changed corresponds to the sum of the differences between the reset signals and the video signals of the same color.

11. The method of claim 9, further comprising:
- generating modulation signal groups respectively corresponding to neighboring rows as many as the number of the reset signals or the video signals, the neighboring rows having the same pattern as that of the selected row;
- summing up the pulse widths of finally activated modulation signals in the modulation signal groups; and
- generating the corresponding digital signal based on the sum value.

12. The method of claim 9, further comprising summing up digital signals generated from the finally activated modulation signals in the modulation signal groups corresponding to the neighboring rows as many as the number of the reset signals or the video signals.

13. The method of claim 9, wherein the solid state image sensing device is of a CIS type.

14. The method of claim 10, wherein the APS array has a Bayer pattern pixel structure.

15. An image sensing device comprising:
- active pixel sensing means having pixels disposed in a two-dimensional matrix for generating reset signals and video signals of respective columns in a selected row;
- correlated double sampling means in signal communication with the active pixel sensing means for receiving the reset signals from neighboring columns of the same color, receiving the video signals from pixels generating the reset signals, and generating a plurality of modulation signals respectively corresponding to the differences between the reset signals and the video signals such that each succeeding one of the plurality of modulation signals is activated in response to the previous modulation signal; and
- digital signal output means in signal communication with the correlated double sampling means for generating a corresponding digital signal responsive to the instant of time when the logic state of the finally activated modulation signal is changed among the plurality of modulation signals, wherein the correlated double sampling means is disposed for generating a modulation signal of a first column, which is activated when the difference between the reset signal and the video signal from the first column reaches a reference level in response to a ramp signal, and for generating a modulation signal of the next same-color column, which is activated when the difference of the reset signal and the video signal of the next same-color column reaches the reference level in response to the ramp signal and the activation of the first column modulation signal.

16. The image sensing device of claim 15, the correlated double sampling means comprising:
- a first switch disposed for transferring the ramp signal;
- a second switch disposed for transferring the reset signals and the video signals; and
- a plurality of correlated double sampling circuits disposed for generating the differences between the reset signals and the video signals and generating the modulation signals activated when the differences reach the reference level in response to the ramp signal, respectively, the correlated double sampling circuits being included in the respective columns, the second switch being tuned off when the modulation signal generated in the previous column is activated.

17. The image sensing device of claim 16, wherein each of the plurality of correlated double sampling circuits comprises:
- a first capacitor connected between the output terminal of the second switch and a first node;

a second capacitor connected between the output terminal of the second switch and the output terminal of the first switch;

an amplifier comparing the signal of the first node with the reference level and amplifying the compared result; and a third switch connected between the first node and the output terminal of the amplifier, a corresponding reset signal being transmitted to the first capacitor when the third switch is turned on, a corresponding video signal being transmitted to the first capacitor when the third switch is turned off.

18. The image sensing device of claim 15, further comprising:

first generator means for generating reset signals and video signals of respective columns in a selected row in an APS array in which pixels are arranged in a two-dimensional matrix form;

first receiver means for receiving reset signals from neighboring columns of the same color;

second receiver means for receiving video signals from pixels generating the reset signals;

second generator means for generating modulation signals respectively corresponding to the differences between the reset signals and the video signals such that each of the modulation signals is activated according to activation of the previous modulation signal; and third generator means for generating a corresponding digital signal based on the instant of time when the logic state of the finally activated modulation signal among the modulation signals is changed.

* * * * *